(12) United States Patent
Shah et al.

(10) Patent No.: US 12,297,094 B1
(45) Date of Patent: May 13, 2025

(54) NON-INVASIVE AUTOMATED BEVERAGE DISPENSER EVALUATION SYSTEM

(71) Applicant: Amazon Technologies, Inc., Seattle, WA (US)

(72) Inventors: Romil Shah, San Jose, CA (US); Theodore Charles Bakanas, New York, NY (US); Cory Jines, Kansas City, MO (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 18/141,315

(22) Filed: Apr. 28, 2023

(51) Int. Cl.
*G06Q 10/20* (2023.01)
*B67D 1/00* (2006.01)
*B67D 1/08* (2006.01)
*G06N 20/00* (2019.01)

(52) U.S. Cl.
CPC ......... *B67D 1/0878* (2013.01); *B67D 1/0888* (2013.01); *G06Q 10/20* (2013.01); *G06N 20/00* (2019.01)

(58) Field of Classification Search
CPC .... B67D 1/0878; B67D 1/0888; G06Q 10/20; G06N 20/00
USPC .......................................................... 141/1
See application file for complete search history.

(56) References Cited

U.S. PATENT DOCUMENTS

| | | | |
|---|---|---|---|
| 6,053,359 A * | 4/2000 | Goulet | B65G 47/22 221/221 |
| 8,162,011 B2 * | 4/2012 | Weems | B67D 1/0888 141/82 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 10,689,240 B1 * | 6/2020 | Schultz | B67D 1/0064 |
| 11,053,109 B2 * | 7/2021 | Knight | B67D 1/1202 |
| 2013/0284806 A1 | 10/2013 | Margalit | |
| 2017/0293983 A1 * | 10/2017 | Long, II | B67D 1/0019 |
| 2020/0031656 A1 * | 1/2020 | Rudick | G06F 3/0486 |

(Continued)

FOREIGN PATENT DOCUMENTS

DE   102015209499 A1 * 11/2016

OTHER PUBLICATIONS

DE-102015209499-A1 English Translation (Year: 2024).*

*Primary Examiner* — Timothy P. Kelly
*Assistant Examiner* — Stephanie A Shrieves
(74) *Attorney, Agent, or Firm* — Athorus, PLLC

(57) ABSTRACT

Systems and techniques for non-invasive beverage quality check and automated maintenance scheduling for automated beverage dispensers. The techniques include using a camera to evaluate performance of the machine and evaluate beverage quality using visual techniques. The system provided herein uses machine learned models to determine beverage quality and evaluate machine operation by using an existing or retrofitted camera in proximity to the dispenser. One or more machine learned algorithms may be used for of evaluating the dispenser and dispensed beverages along various metrics to identify any fault in the system over time. If the quality degrades over time or an error is detected, the system may recalibrate the machine or alert a maintenance system to schedule maintenance for the machine.

20 Claims, 7 Drawing Sheets

(56) References Cited

U.S. PATENT DOCUMENTS

| | | | | |
|---|---|---|---|---|
| 2020/0214493 A1* | 7/2020 | Pugliese | ............... | A47J 31/525 |
| 2021/0124948 A1* | 4/2021 | Wang | ..................... | G06V 40/11 |
| 2022/0017351 A1* | 1/2022 | Khan | ................... | B67D 1/0081 |
| 2022/0048753 A1* | 2/2022 | Karol | ................... | B67D 1/0882 |

* cited by examiner

NON-INVASIVE AUTOMATED BEVERAGE DISPENSER EVALUATION SYSTEM

BACKGROUND

Generally, when a customer enters an order at a restaurant or other venue that serves food or beverages, orders are placed through a point of sale (POS) system which may include a physical terminal. These POS systems record the customer order details that are then relayed to a kitchen, beverage preparation area or other food or beverage area that could be located either on or off premise where the staff members assemble each of the food or beverage items based upon the customer order. In restaurant or other food service environments, beverages are sometimes prepared by an automated beverage dispenser that dispenses beverages according to customer orders for delivery to the customer.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
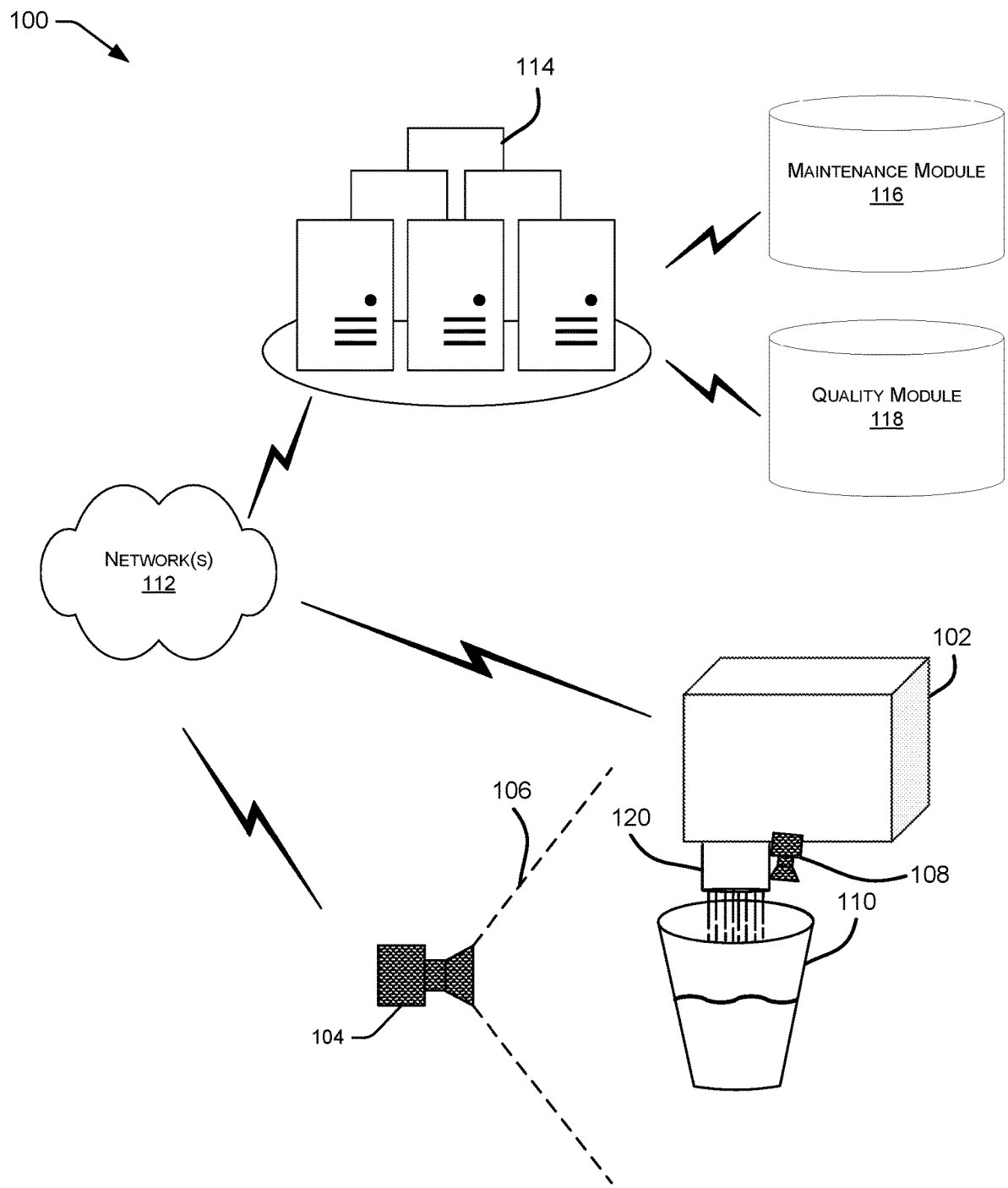
FIG. 1 illustrates a system for evaluating and automatically recalibrating an automated beverage dispenser system, according to at least one example.

Described herein are, among other things, techniques, devices, and systems, for non-invasive beverage quality check and automated maintenance scheduling for automated beverage dispensers. Automated beverage dispensers provide for dispensing a beverage and ice into a cup. The automated beverage dispenser may include an ice dispensing station with an ice auger and a weight sensor, a beverage dispensing station, and a control device. The control device instructs the ice auger to fill the cup with a predetermined amount of ice and instructs the beverage dispensing station to fill the cup with a predetermined amount of the beverage in response to a weight of the cup as determined by the weight sensor. In some examples, the filling of the cup with ice and/or the beverage may be based on other sensors in place of and/or in addition to the weight sensor.

The automated beverage dispensers discussed herein may be configured for producing coffee, soda, water, alcohol, beer, etc. for restaurant and other customer service facilities and locations. Such automated beverage dispensers typically have scheduled maintenance to maintain the quality of the beverage being poured. However, the maintenance can be expensive, time consuming, and may often not be required when scheduled. The present disclosure provides for non-invasive evaluation and monitoring of automated beverage dispenser systems to determine a quality of the beverage being poured from the machine. The system is non-invasive as it does not require the addition of intrusive sensors and complex infrastructure to incorporate within the environment of the restaurant or other facility. Rather, a single camera or image sensor may be non-invasively placed within proximity of the automated beverage dispenser and calibrated (e.g., relative to its position and location relative to the dispenser). The system may check for any machine related defects or external factors like human related errors. A suite of machine learned algorithms may be capable of evaluating the dispenser and the dispensed beverages in many different factors or evaluation metrics to identify any fault in the system over time. If the quality degrades over time or an error is detected, the system can automatically detect if the issue can be resolved by internally recalibrating the machine or if the system should automatically alert a maintenance system to schedule maintenance for the device. The system provided herein uses machine learned models to determine beverage quality and evaluate machine operation by using an existing or retrofitted camera in proximity to the dispenser.

The systems described herein includes an automated beverage dispenser and a camera directed at the beverage dispenser. The camera is used to capture image data of the automated beverage dispenser, a display associated therewith, a cup, conveyor system for positioning the cup, and beverage dispensed into the cup. A computing device communicably connected with the camera is used to determine evaluation scores associated with the system based on image data and to classify any detected errors. Based on the evaluation scores and the detected errors the computing device determines if the system needs to recalibrate, adjust one or more functions, schedule maintenance, or proceed as presently configured.

Different types of automated beverage dispensers may be used with the non-invasive system described herein, because the system is configured to not rely on data beyond image data from a camera, though additional sensor data and other data may be used in making the evaluation. For example, described herein are at least two different types of automated beverage dispensers. A first example includes a dispenser having a cup filling location that is the same as where the cup is grabbed for delivery to a customer. A second example includes a conveyor system such that the cup may be delivered to the dispensing spout to be filled and subsequently conveyed away from the filling location to a customer delivery location. In either case, the camera may be positioned and oriented such that it is directed at the cup filling location and may optionally include, within the field of view of the camera, the conveyor belt. The camera may be connected to the computing device through a local network, or other such network as described herein such that the computing device may be coupled with, proximate to, or remote from the camera and automated beverage dispenser. The computing device may determine, based on the camera data the overall quality of the beverage poured from the automated beverage dispenser or of the machine and if the machine needs recalibration and/or maintenance.

The computing device may determine the quality scores and perform evaluation of beverages and/or the dispensing machine at or near real-time using real-time image data from the camera and the use of one or more machine learned models. The machine learned models may each be configured to determine a particular evaluation, such as evaluation of beverage type, temperature, carbonation, ice amount, beverage fill level, cup placement, cup delivery, and other such factors. In some examples, a single machine learned model may be used to output one or more evaluation scores associated with characteristics of the machine, beverage, conveyor, or other such components.

For example, the computing device may determine that a cup is being filled with a dark beverage and may determine a beverage type, brand, or other such identification of the beverage. The computing device may also determine if the cup is under-filled, over-filled, or filled to a target range as well as presence of double or multiple cups. The computing device may also determine a carbonation level and the presence of ice or a hot beverage. The computing device may determine the position of the cup (e.g., as delivered by the conveyor and/or manual placement) and any other errors due to conveyor or cup delivery from a cup dispenser (e.g., dispensing the wrong size or type of cup for the ordered beverage). The computing device may also use image data from the camera to view a display of the automated dispenser and determine if any notifications are provided on the screen. The computing device can output an evaluation of the fill for one or more cups from start to end, for example over a time period. In this manner, one or more beverage fills may be observed by the computing device to determine trends in errors or evaluation scores and thereby identify a need for recalibration of a component or function and/or maintenance for the system. Degradation or slight errors in the cup filling can be observed through such aggregation that may not be visible or readily apparent to a manual observer such as a worker or operator.

The computing device may implement a set of machine learned models for various determinations and evaluations of the system. For instance, a first model may be used for detection of a cup (e.g., as dispensed and/or delivered by a conveyor system or otherwise). After a cup is detected at the fill location, the computing device may implement a series of models, such as described herein to determine different scores and evaluation of different aspects associated with filling the cup. A buffer for filling a particular cup can be updated to include the output of the different models until the cup is removed. After the cup is removed, the buffer may be reset and the data from the previous fill may be stored or used for trend evaluation.

The system described herein provides for evaluation as well as recalibration of the automated beverage dispenser, as needed. For example, image data from the camera may be passed through one or more machine learned models used to generate output data as described herein. The output data can be used to determine error scores or presence of errors within the system. The error scores and/or presence of errors can be used to determine when to recalibrate the system, automatically. The error scores may, for example, be indicative of variation for a particular metric associated with a currently pouring or recently poured beverage from a steady state for the metric and/or a threshold for the metric. In the event that the error score falls outside of a threshold range (e.g., acceptable variance) then the system may determine that recalibration and/or maintenance is needed for the system. Recalibration can be carried out in an automated or manual manner in response to the determination of degradation for the one or more metrics associated with pouring the beverage. Following recalibration, the machine performance is checked over time to verify if the recalibration has worked. If the recalibration has failed, or if the error was not corrected by the recalibration, or the error cannot be used to identify a particular setting or function for recalibration, then the computing device may alert a maintenance system to schedule maintenance.

In some examples, the computing device may send a notification to a system connected with the facility indicating that the dispenser should be recalibrated. In some examples, the notification may include indications of the functions and/or particular settings to be recalibrated. A manual recalibration may be performed using the settings provided in the notification. In some examples, the recalibration may be performed automatically, without user input. The error scores discussed above may be used to identify particular deviations and degradations in performance as well as identify functions associated therewith and corresponding settings of the functions (e.g., speeds, rates, flow rates, temperatures, etc.).

One general aspect includes a system for automatically dispensing beverages based on customer order data. The system includes an automated beverage dispenser that includes a conveyor system for delivering a cup to be filled by the automated beverage dispenser, a spout for delivering a beverage into the cup, and a first sensor for determining a fill level of the beverage within the cup, where the automated beverage dispenser is configured to adjust a flow of the beverage based on data from the first sensor. The system also includes a camera positioned proximate the automated beverage dispenser and having a field of view may include the automated beverage dispenser and a cup location beneath the spout. The system further has a computing device that includes a processor and one or more non-transitory computer-readable medium having instructions stored thereon that, when executed by the processor, cause the processor to perform various operations. The operations may include receiving image data from the camera, the image data associated with the automated beverage dispenser filling the cup and determining, by using a machine learned model, one or more evaluation scores associated with the automated beverage dispenser filling the cup. The operations may also include determining an error score associated with the automated beverage dispenser filling the cup based at least in part on the one or more evaluation scores. The operations also include generating an alert to a maintenance system in response to the error score being above a first threshold, recalibrating the automated beverage dispenser in response to the error score being between a second threshold and the first threshold, where the second threshold is lower than the first threshold, and storing, in a memory device associated with the computing device, the error score in response to the error score being below the second threshold.

Implementations may include one or more of the following features. Recalibrating the automated beverage dispenser may include determining an error trend over a first time period based at least in part on the error score, the error trend indicative of an aggregation of one or more error scores over the first time period, determining to recalibrate the automated beverage dispenser in response to the error trend being over a third threshold, determining a function of the automated beverage dispenser associated with the error trend, and recalibrating the function based on the error trend.

Recalibrating the automated beverage dispenser may further include determining a second error trend over a second period of time, generating the alert to the maintenance system in response to the second error trend being over a fourth threshold, and determining a successful recalibration in response to the second error trend being below the fourth threshold. Determining the one or more evaluation scores may include generating the one or more evaluation scores using a set of machine learning models trained to output a set of evaluation scores associated with beverage temperature, beverage carbonation, cup fill level, cup placement, and beverage flow quality in response to the image data.

One general aspect includes a method for operating an automated beverage dispenser. The method includes receiving sensor data from a sensor configured to capture the sensor data associated with an automated beverage dispenser filling a cup. The method also includes determining, by using a machine learned model, an evaluation score associated with the automated beverage dispenser filling the cup and generating an alert to a maintenance system in response to the evaluation score being below a first threshold. The method also includes determining to automatically recalibrate the automated beverage dispenser in response to the evaluation score being between a second threshold and the first threshold, where the second threshold is higher than the first threshold and determining to continue dispensing beverages in response in response to the evaluation score being above the second threshold. Other embodiments of this aspect include corresponding computer systems, apparatus, and computer programs recorded on one or more computer storage devices, each configured to perform the actions of the methods.

Implementations may include one or more of the following features. The method may include recalibrating the automated beverage dispenser in response to determining to automatically recalibrate by determining a function of the automated beverage dispenser to recalibrate and adjusting the function based at least in part on the evaluation score. Recalibrating the automated beverage dispenser may further include determining an error trend over a first time period based at least in part on the evaluation score, the error trend indicative of an aggregation of one or more evaluation scores over the first time period, determining the function of the automated beverage dispenser based at least in part on the error trend, and adjusting the function based on the error trend. Recalibrating the automated beverage dispenser may further include determining a second error trend over a second period of time, generating the alert to the maintenance system in response to the second error trend being over a fourth threshold, and determining a successful recalibration in response to the second error trend being below the fourth threshold. Determining the evaluation score may include determining, by one or more machine learned models, a set of scores associated with a set of factors associated with filling the cup by the automated beverage dispenser. The method may also include recalibrating the automated beverage dispenser in response to determining to automatically recalibrate by determining a factor of the set of factors to recalibrate based on the set of scores, determining a function of the automated beverage dispenser associated with the factor, and adjusting the function based at least in part on a score of the set of scores associated with the factor. Determining the evaluation score may further based on the order data associated with the beverage being filled. The sensor may include a camera positioned proximate to the automated beverage dispenser. The machine learned model may be trained to output the evaluation score using image data tagged with score data and associated variance data for a range of beverage products. The method may also include receiving order data from an ordering system of a facility, dispensing a cup based at least in part on the order data, delivering the cup to a cup filling location using an automated conveyor system, and filling the cup using the automated beverage dispenser based at least in part on the order data. Implementations of the described techniques may include hardware, a method or process, or computer software on a computer-accessible medium.

Turning to the figures, FIG. 1 illustrates a system 100 for evaluating and automatically recalibrating a beverage dispenser 102, according to at least one example. The beverage dispenser 102 may be an automated beverage dispenser, as described above. The beverage dispenser 102 includes a spout 120 through which beverages are delivered and may also include a sensor 108 for determining a fill level of the cup 110 and thereby shutting off the spout 120 when the cup 110 reaches an appropriate fill level. The beverage dispenser 102 may have an automated cup placement system, such as the conveyor of FIG. 2, or may have a cup dispenser or other manner of placing the cup 110 underneath the spout 120. The beverage dispenser 102 may communicatively couple, over network(s) 112, to the computing device(s) 114, discussed below, for example to receive order data, return sensor data, and other such tasks.

A camera 104 is directed at the beverage dispenser 102 and proximate to the beverage dispenser 102. The camera 104 may be a camera placed in the facility using the beverage dispenser 102 for purposes of evaluating performance of the beverage dispenser 102 or may use an existing camera within the facility. The camera 103 has a field of view 106 that enables the camera 104 to capture image data of the beverage dispenser 102, cup 110, spout 120, a display associated with the beverage dispenser 102 (not shown in FIG. 1), a cup dispenser, and other related systems or components.

The camera 104 may convey the image data over a network(s) 112 to computing device(s) 114. The computing device(s) 114, which may include components such as shown and described with respect to FIG. 7 and includes a maintenance module 116 and a quality module 118. The maintenance module 116 may be used to communicate with a maintenance system and/or generate maintenance alerts. The quality module 118 may be used to determine evaluation score(s) for the beverage dispenser 102 and thereby evaluate the performance thereof to identify a potential need for recalibration or maintenance.

In some embodiments, the network(s) 112 may be any type of network known in the art, such as the Internet. Moreover, the computing device(s) 114, camera 104, and beverage dispenser 102 may communicatively couple to the network(s) 112 in any manner, such as by a wired or wireless connection.

The computing device(s) 114 may also include one or more processor(s) and computer-readable media, which may include the maintenance module 116 and the quality module 118. In various embodiments, the computing device(s) 114 may be implemented within the beverage dispenser 102, such as with a built-in computing device. In some examples, the computing device(s) 114 may be remote from the beverage dispenser 102 and may even be remote from a facility using the beverage dispenser 102.

The processor(s) of the computing device(s) 114 may execute one or more modules and/or processes to cause the computing device(s) 114 to perform a variety of functions, as set forth herein. In some embodiments, the processor(s)

may include a central processing unit (CPU), a graphics processing unit (GPU), both CPU and GPU, or other processing units or components known in the art. Additionally, each of the processor(s) may possess its own local memory, which also may store program modules, program data, and/or one or more operating systems.

In at least one configuration, the computer-readable media of the computing device(s) 114 may include any components that may be used to determine quality scores and perform evaluation of beverages (e.g., cup 110) and/or the beverage dispenser 102 at or near real-time using real-time image data from the camera 104 and the use of one or more machine learned models, for example implemented by the maintenance module 116 and/or the quality module 118. The machine learned models may each be configured to determine a particular evaluation, such as evaluation of beverage type, temperature, carbonation, ice amount, beverage fill level, cup placement, cup delivery, and other such factors for the cup 110 and/or beverage dispenser 102. In some examples, a single machine learned model may be used to output one or more evaluation scores associated with characteristics of the machine, beverage, conveyor, or other such components.

For example, the computing device(s) 114 may determine that a cup 110 is being filled with a dark beverage and may determine a beverage type, brand, or other such identification of the beverage. The computing device(s) 114 may also determine if the cup 110 is under-filled, over-filled, or filled to a target range as well as presence of double or multiple cups. The computing device(s) 114 may use the data from the camera 104 to make the determinations. In some examples additional sensors, such as sensor 108 may be used to aid in the determinations by computing device(s) 114. The computing device(s) 114 may also determine a carbonation level and the presence of ice or a hot beverage. The computing device(s) 114 may determine the position of the cup 110 (e.g., as delivered by the conveyor and/or manual placement) and any other errors due to conveyor or cup delivery from a cup dispenser (e.g., dispensing the wrong size or type of cup for the ordered beverage). The computing device(s) 114 may also use image data from the camera 104 to view a display of the beverage dispenser 102 and/or a cup dispenser to determine if any notifications are provided on the screen and/or to access information available on the display. The computing device(s) 114 can output an evaluation of the fill for one or more cups from start to end, for example over a time period. In this manner, one or more beverage fills may be observed by the computing device to determine trends in errors or evaluation scores and thereby identify a need for recalibration of a component or function and/or maintenance for the beverage dispenser 102. Degradation or slight errors in the cup filling can be observed through such aggregation that may not be visible or readily apparent to a manual observer such as a worker or operator.

The computing device(s) 114 may implement a set of machine learned models for various determinations and evaluations of the system. For instance, a first model may be used for detection of the cup 110 (e.g., as dispensed and/or delivered by a conveyor system or otherwise). After the cup 110 is detected at the fill location, the computing device(s) 114 may implement a series of models, such as described herein to determine different scores and evaluation of different aspects associated with filling the cup 110. A buffer for filling a cup 110 can be updated to include the output of the different models until the cup 110 is removed. After the cup 110 is removed, the buffer may be reset and the data from the previous fill may be stored or used for trend evaluation.

In addition, and as mentioned previously, the computing device(s) 114 may include the one or more processor(s) and the computer-readable media. The computing device(s) 114 may also include additional components not listed above that may perform any function associated with the computing device(s) 114. In various embodiments, the computing device(s) 114 may be any type of server, such as a network-accessible server, and may be one of multiple servers included in a server cluster or server farm.

In some examples, the computing device(s) 114 includes or has access to one or more machine learned models (e.g., data models) configured to determine quality scores for the beverage dispenser 102, the beverages dispensed therefrom, a cup dispenser, and other system components as well as to determine when maintenance is required and on what components maintenance is needed. As part of determining the quality scores and maintenance needs, one or more machine learned models may be used for object detection estimation, object classification, or other tasks described herein. Machine learning may take empirical data as input, such as data from the sensors of the machines as well as object data and machine location. Machine learning systems may take advantage of data to capture characteristics of interest that have an unknown underlying probability distribution or weighting. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically. As applied to the present technology, machine learning may be used to learn which performance characteristics are preserved during a localization process and validate localized content when the performance characteristics are preserved.

The machine learning modules (e.g., maintenance module 116 and quality module 118) may include one or more machine learning models that may perform one or more tasks as described herein, including object recognition, object identification, classification, segmentation, feature recognition, language processing, and other such tasks.

Machine learning may be performed using a wide variety of methods of combinations of methods, such as contrastive learning, supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, Fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottle-neck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure. Support vector machines (SVMs) and regression are a couple of specific examples of machine learning that may be used in the present technology.

In some examples, the machine learned models may include access to or versions of multiple different machine learning models that may be implemented and/or trained according to the techniques described herein. Any suitable machine learning algorithm may be implemented by the machine learning models. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The one or more machine learning algorithms may be trained using training examples. The training examples may include example inputs of sensor data from a variety of sensors (e.g., camera 104) as well as desired outputs (e.g., quality scores) associated with the inputs, the desired outputs identifying the objects, system components, characteristics, qualities, errors, and other such information. Training the machine learning algorithms using the training examples may generate a trained machine learning algorithm, and the trained machine learning algorithm may be used to estimate outputs for inputs not included in the training examples. In some examples, engineers, scientists, processes, and machines that train machine learning algorithms may further use validation examples and/or test examples. For example validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison.

The system 100 provides for evaluation as well as recalibration of the beverage dispenser 102, as needed. For example, image data from the camera 104 may be passed through one or more machine learned models of the maintenance module 116 and/or the quality module 118 used to generate output data as described herein. The output data can be used to determine error scores or presence of errors within the system. The error scores and/or presence of errors can be used to determine when to recalibrate the system, automatically. The error scores may, for example, be indicative of variation for a particular metric associated with a currently pouring or recently poured beverage from a steady state for the metric and/or a threshold for the metric. In the event that the error score falls outside of a threshold range (e.g., acceptable variance) then the system may determine that recalibration and/or maintenance is needed for the system. Recalibration can be carried out in an automated or manual manner in response to the determination of degradation for the one or more metrics associated with pouring the beverage. Following recalibration, the machine performance is checked over time to verify if the recalibration has worked. If the recalibration has failed, or if the error was not corrected by the recalibration, or the error cannot be used to identify a particular setting or function for recalibration, then the computing device may alert a maintenance system to schedule maintenance.

In some examples, the computing device(s) 114 may send a notification to a system connected with the facility indicating that the beverage dispenser 102 should be recalibrated. In some examples, the notification may include indications of the functions and/or particular settings to be recalibrated. A manual recalibration may be performed using the settings provided in the notification. In some examples, the recalibration may be performed automatically, without user input. The error scores discussed above may be used to identify particular deviations and degradations in performance as well as identify functions associated therewith and corresponding settings of the functions (e.g., speeds, rates, flow rates, temperatures, etc.).

Figure 2:
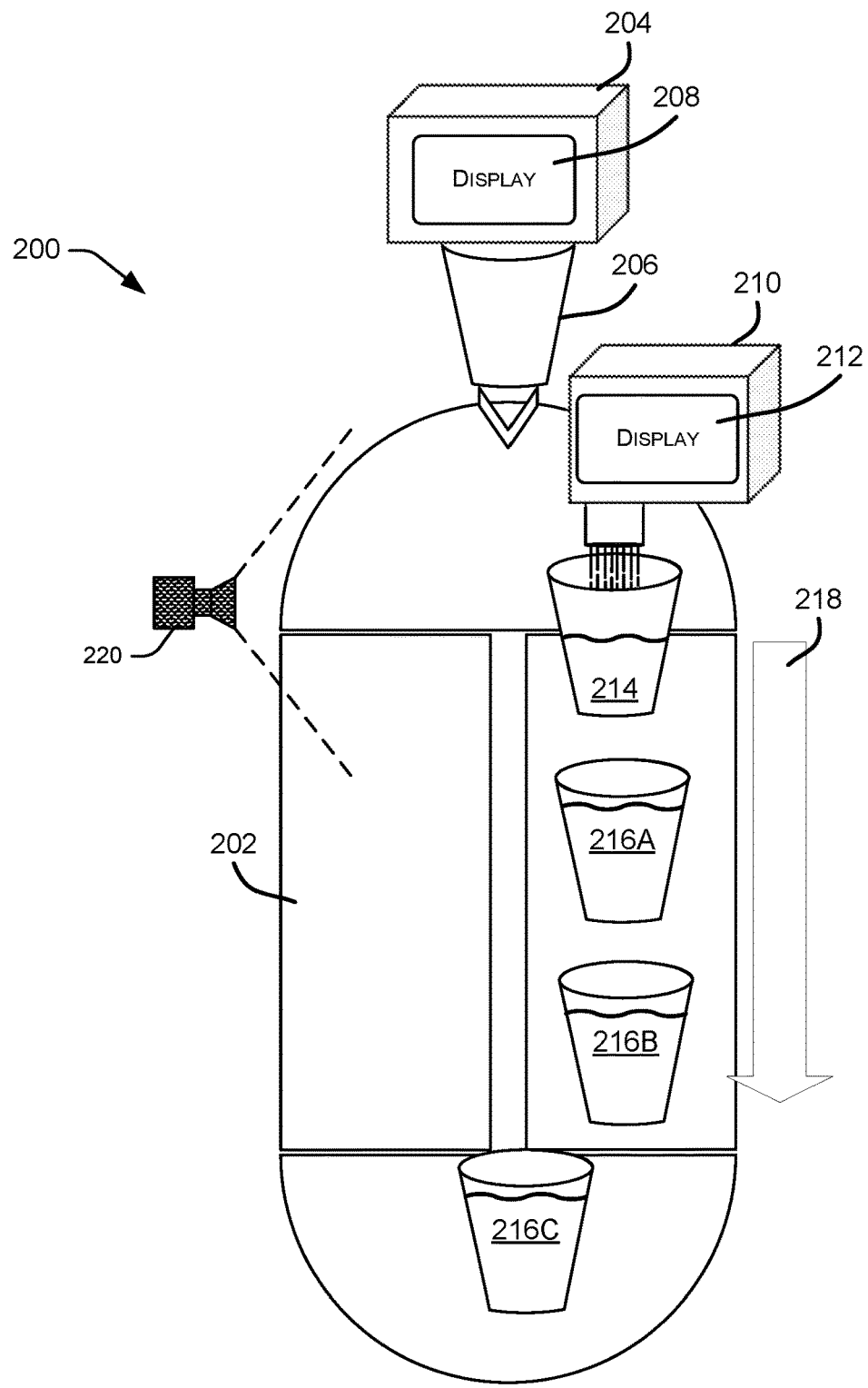
FIG. 2 illustrates a system for evaluating and automatically recalibrating an automated beverage dispenser system, according to at least one example.

FIG. 2 illustrates a system 200 for evaluating and automatically recalibrating an automated beverage dispenser 210, according to at least one example. The automated beverage dispenser 210 is one component of the system 200 that also includes a conveyor 202, cup dispenser 204, and camera 220. The system 200 provides for a fully automated system to receive a customer order for a beverage, dispense a cup 206 from the cup dispenser 204 onto the conveyor 202, move the conveyor to position the cup 206 under the automated beverage dispenser 210. A cup 214 under the automated beverage dispenser 210 is filled based on the customer order.

The cup dispenser 204 may also include a display 208 for displaying an upcoming order, present order information (e.g., cup type), a number of cups remaining, types of cups available, error information, and other such data. The automated beverage dispenser 210 also includes a display 212 for displaying information related to an upcoming order, current order, supply remaining, options for beverages, temperature of water and/or beverage components, and other such information, including error codes for the automated beverage dispenser 210.

The conveyor 202 moves the cup 206 from the cup dispenser 204 to the automated beverage dispenser 210 where it can be filled (and may also be filled with ice), After a cup 214 is filled, it may be moved along the conveyor 202 along direction 218 to a delivery area where the customer or a worker may deliver the ordered beverage. Accordingly, the system may deliver beverages continuously along the conveyor 202 with beverages 216A, 216B, and 216C complete and ready for delivery to customers.

The camera 220 is directed at the system 200 and may capture image data of the conveyor 202, cup dispenser 204, cup 206, display 208, automated beverage dispenser 210, display 212, filling cup 214, and beverages 216A, 216B, and 216C. The camera 220 looking at the system 200 is connected to one or more computing systems either locally or on the cloud (e.g., computing device(s) 114). The computing device determines the overall quality of the beverage or of the system 200 and if the system 200 needs recalibration, maintenance, or other attention.

FIGS. 3-6 illustrate flow diagrams of processes according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Figure 3:
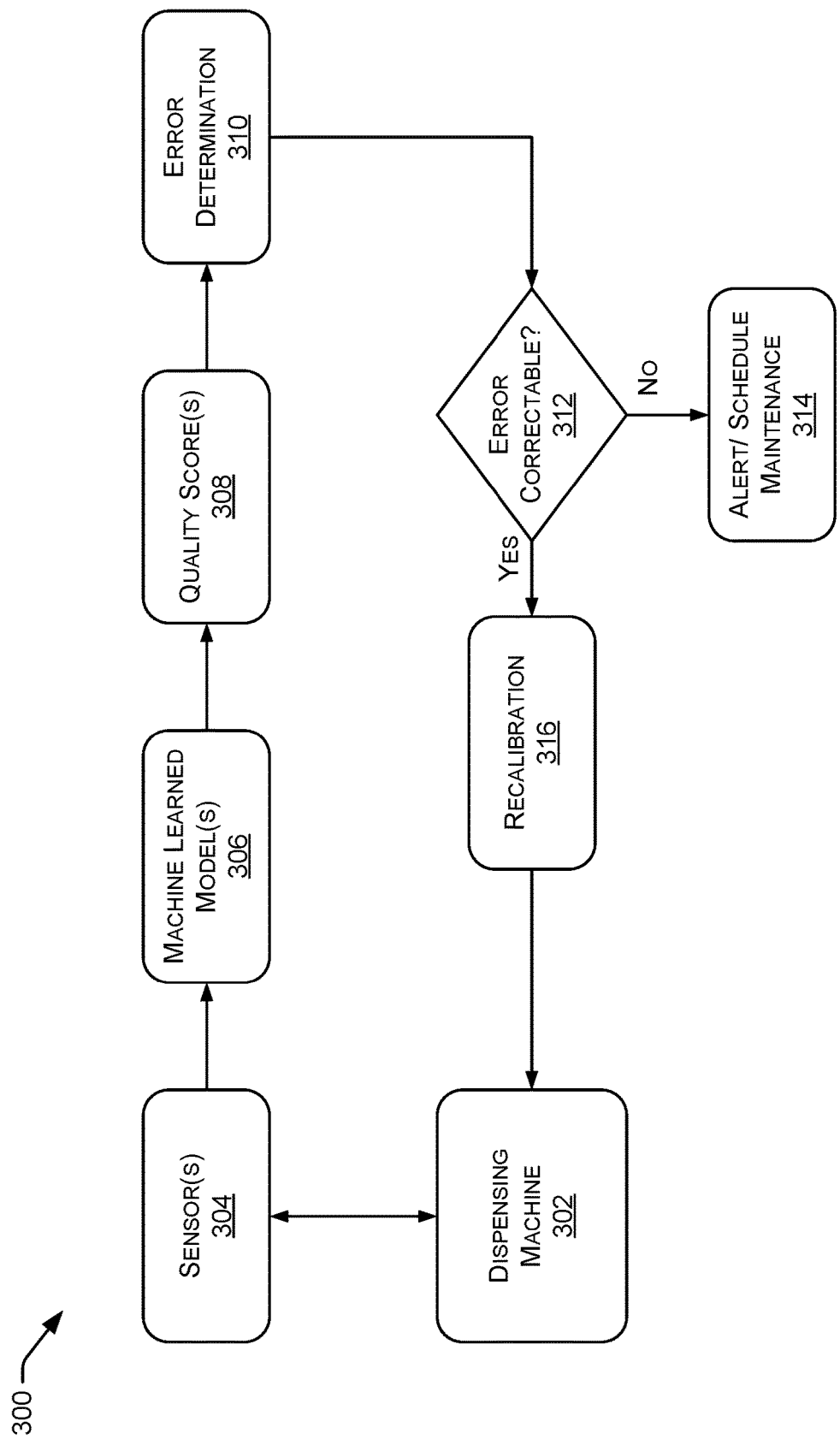
FIG. 3 illustrates a flow diagram depicting a process for evaluating and recalibrating an automated beverage dispenser system, according to at least one example.

FIG. 3 illustrates a flow diagram depicting a process 300 for evaluating and recalibrating an automated beverage dispenser system, according to at least one example. The process 300 may be used to receive sensor data, determine performance of an automated beverage dispenser, classify errors, determine if recalibration or maintenance are required, and perform automated recalibration. The process 300 provides for non-invasive evaluation and monitoring of automated beverage dispenser systems to determine a quality of the beverage being poured from the machine. The process 300 is non-invasive as it does not require the addition of intrusive sensors and complex infrastructure to incorporate within the environment of the restaurant or other facility where the automated beverage dispenser system is in use. Instead, a single camera or image sensor may be non-invasively placed within proximity of the automated beverage dispenser and calibrated (e.g., relative to its position and location relative to the dispenser).

The process 300 is performed on a dispensing machine 302, as described herein, with a sensor (e.g., camera) directed at the dispensing machine 302. The sensor(s) 304 is used to capture image data of the dispensing machine 302, a display associated therewith, a cup, conveyor system for positioning the cup, and beverage dispensed into the cup. A computing device communicably connected with the sensor(s) 304 and/or dispensing machine 302 may perform the process 300 to determine evaluation scores associated with the dispensing machine 302 based on image data (e.g., sensor data) and to classify any detected errors. Based on the evaluation scores and the detected errors the computing device determines if the system needs to recalibrate, adjust one or more functions, schedule maintenance, or proceed as presently configured.

Different types of dispensing machines may be used with the non-invasive system described herein, because the system is configured to not rely on data beyond image data from a camera (e.g., sensor(s) 304), though additional sensor data and other data may be used in making the evaluation. Though described herein with respect to automated beverage dispensers, the dispensing machine 302 may instead be replaced by one or more other machines, components, or systems in an environment that may be monitored by the sensor(s) 304 and associated computing device. In any case, the sensor(s) 304 may be positioned and oriented such that it is directed at the cup filling location of the dispensing machine 302 and may optionally include, within the field of view of the camera, the conveyor belt or other system components. The sensor(s) 304 may be connected to the computing device through a local network, or other such network as described herein such that the computing device may be coupled with, proximate to, or remote from the sensor(s) 304 and the dispensing machine 302. The computing device may determine, based on the sensor data data the overall quality of the beverage poured from the dispensing machine 302 or of the dispensing machine 302 and if the dispensing machine 302 needs recalibration and/or maintenance.

The computing device may convey the sensor data to one or more machine learned models 306 that may be configured to determine quality score(s) 308 such as evaluation of beverage type, temperature, carbonation, ice amount, beverage fill level, cup placement, cup delivery, and other such factors. In some examples, a single machine learned model may be used to output one or more evaluation scores associated with characteristics of the machine, beverage, conveyor, or other such components. The process 300 includes determining, by using a machine learned model, quality score(s) associated with the automated beverage dispenser filling the cup and generating an alert 314 to a maintenance system in response to the quality score(s) 308 being below a first threshold. Determining the quality score(s) 308 may include determining, by one or more machine learned models, a set of scores associated with a set of factors associated with filling the cup by the dispensing machine 302.

The computing device may make an error determination 310 based on the quality score(s) 308. The error determination 310 may result in an error score that corresponds to a difference between a steady state and/or expected score for particular characteristics of the beverage. The error score may be compared against a threshold, and in the event that the error score is above the threshold, the dispensing machine 302 may be determined to be operating out of compliance and/or inconsistently. In some examples, the error determination 310 may include evaluation of quality score(s) 308 over time, e.g., over a first time period, and result in a first error determination. The error determination over time may be used to identify an error trend, such as a decrease in carbonation, increase in temperature, or other drifting, inconsistent, or otherwise different characteristics of the machine and/or delivered beverages.

The process 300 may include determining, at 312, if the error from error determination 310 is correctable through a recalibration. For example, the process 300 may include the computing device determining that the error is not correctable in response to identifying that the error is related to a machine and/or system failure. The process 300 may include determining that the error is correctable in response to detecting that a function of the dispensing machine 302 and/or system can be corrected through a recalibration to bring the dispensing machine 302 back into compliance with the expected quality score(s) 308. The process 300 may automatically recalibrate the dispensing machine 302 in response to the quality score(s) 308 being between a second threshold and the first threshold, where the second threshold is higher than the first threshold and determining to continue dispensing beverages in response in response to the quality score(s) 308 being above the second threshold. The recalibration may include detection of a function to recalibrate based on the quality score(s) 308 and subsequently recalibrating the targeted function.

The process 300 may include performing recalibration 316 of the dispensing machine 302 in response to the error determination 310 determining that the error is correctable at 312. Recalibration may be performed by determining a function of the dispensing machine 302 to recalibrate and adjusting the function based at least in part on the quality score(s) 308. Recalibrating the automated beverage dispenser may further include determining an error trend over a first time period based at least in part on the quality score(s) 308, the error trend indicative of an aggregation of one or more quality score(s) 308 over the first time period, determining the function of the dispensing machine 302 based at least in part on the error trend, and adjusting the function based on the error trend. Recalibrating the dispensing machine 302 may further include determining a second error trend over a second period of time, generating the alert 314 to the maintenance system in response to the second error trend being over a fourth threshold, and determining a successful recalibration in response to the second error trend being below the fourth threshold.

The process 300 may perform the recalibration 316 of the dispensing by determining a first score from a set of quality score(s) 308 associated with a function of the dispensing machine 302. The first score may be associated with a particular characteristic and/or factor, such as temperature, flow rate, carbonation, etc. The recalibration is discussed further with respect to FIGS. 4-5 herein.

Figure 4:
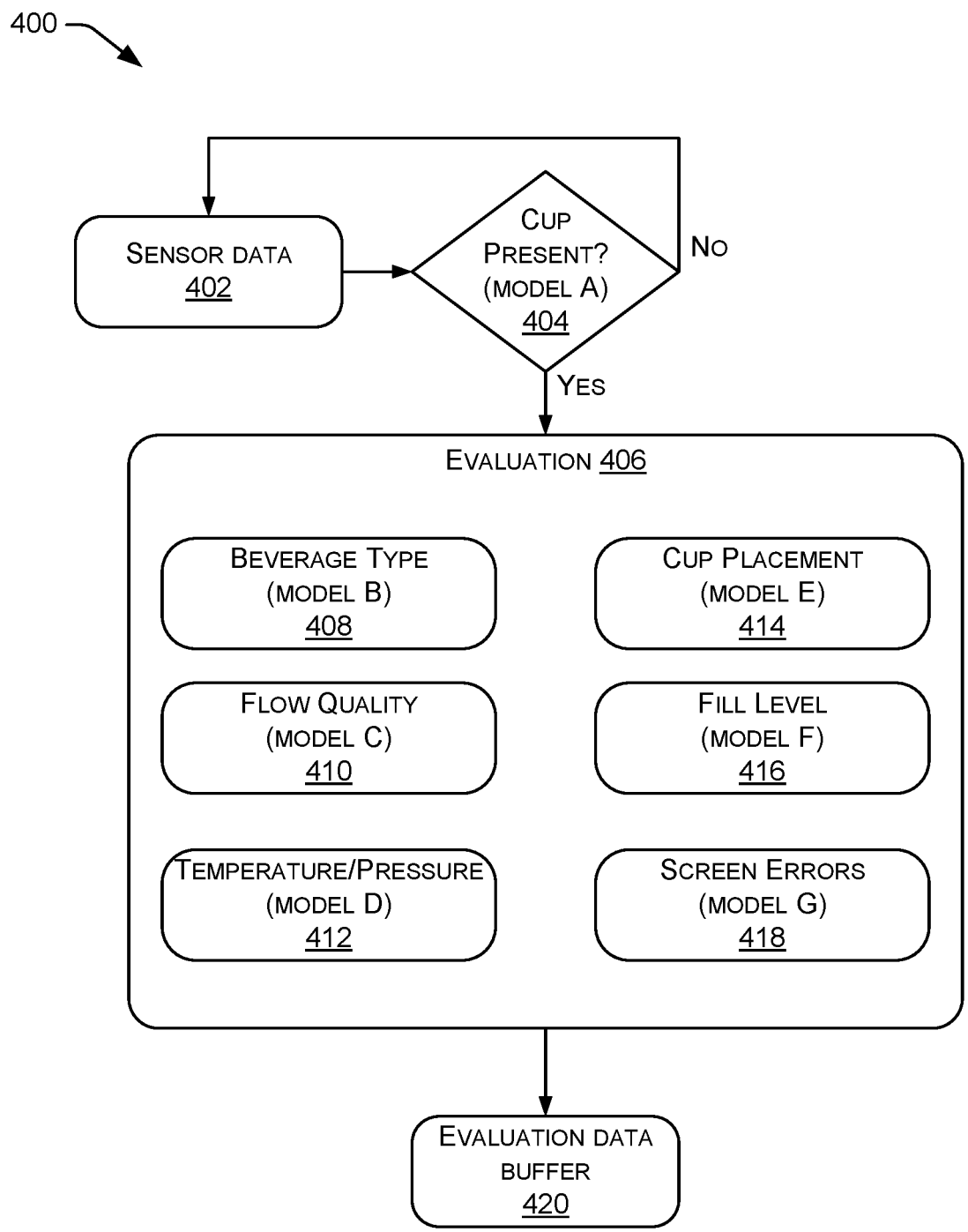
FIG. 4 illustrates a flow diagram depicting a process for evaluating and recalibrating an automated beverage dispenser system using a suite of machine learned models, according to at least one example.

FIG. 4 illustrates a flow diagram depicting a process 400 for evaluating and recalibrating an automated beverage dispenser system using a suite of machine learned models, according to at least one example. Process 400 may be performed using the system 100 and/or system 200 described herein, among other systems. The process 400 includes receiving sensor data 402 from one or more sensor(s) associated with the system. For example, the sensor data 402 may include camera data. The sensor data may include data from other sensors, such as proximity, presence, depth, and other such sensors. The sensor data 402 may be received at a computing device, such as computing device(s) 114.

Based at least in part on the sensor data 402, the process 400 includes a computing device, such as the computing device(s) 114 determining if a cup is present at 404. At 404, the process 400 involves the computing device using a first model (e.g., model A) to determine whether a cup is present. The computing device may determine presence at a cup fill location positioned beneath a spout of a dispensing machine. In the event that a cup is not detected at the cup fill location, then the process 400 returns to 402 and continues to receive sensor data 402 until the cup is detected. In some examples, the first model may include an object detection model, or other such machine learned algorithm that may determine that a cup is visible in the sensor data 402 and that the cup is in the cup fill location. In some examples, the sensor data 402 may include proximity data, or other such data that may be used to determine a presence of a cup at the cup fill location.

In the event that a cup is determined to be at the cup fill location at 404, then the computing device proceeds to evaluation 406 where the computing device uses a series of models to determine different scores as part of evaluation 406 related with a cup filling event. Determining the evaluation 406 may include generating one or more evaluation scores using a set of machine learning models trained to output a set of evaluation scores associated with beverage type 408, beverage flow quality 410, beverage temperature and/or pressure 412, cup placement accuracy 414, fill level 416, and errors displayed 418 on a screen of the dispensing device. The models used in evaluation 406 may include machine learning models, as described herein, that were trained with evaluation scores annotated onto evaluated sensor data.

After the evaluation 406 is complete, which may be performed in or near real-time, then the process 400 proceeds to update a buffer associated with the cup fill event. The buffer of an event would be initiated when the cup is first detected at 404 and then the buffer would be updated with the output of the evaluation, including the various models for all subsequent frames of image data. The buffer is continuously updated and once the cup is not seen (e.g., because a conveyor removed it or it was manually removed), the buffer may then be passed on for further analytics and then cleared in preparation for a new buffer associated with a new fill event.

Figure 5:
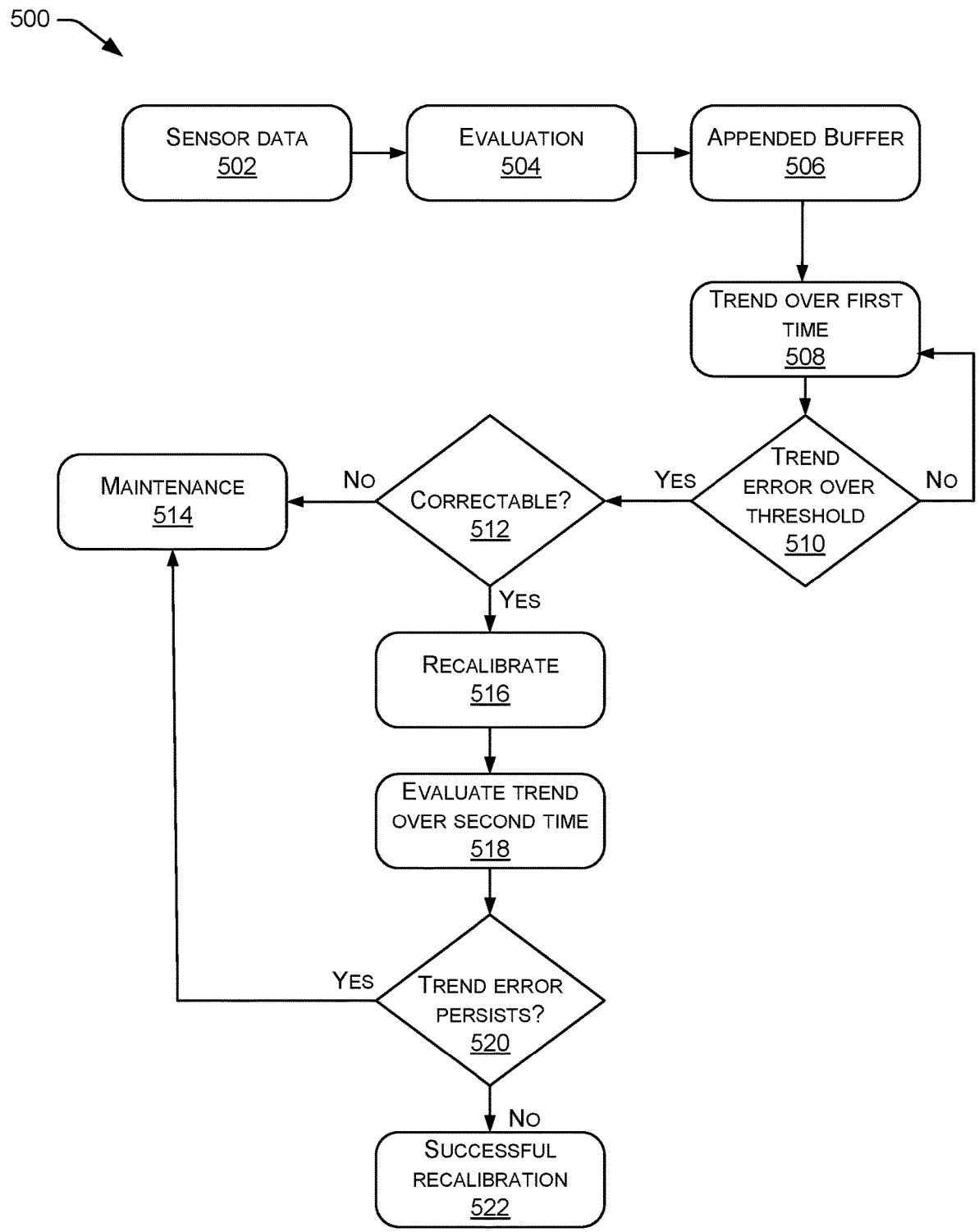
FIG. 5 illustrates a flow diagram depicting a process for recalibrating an automated beverage dispenser system, according to at least one example.

FIG. 5 illustrates a flow diagram depicting a process 500 for recalibrating an automated beverage dispenser system, according to at least one example. The process 500 may include a manual and/or an automated recalibration. The manual calibration may include determining recalibration data and generating a notification including the information (e.g., recalibration data) to be used in a manual recalibration.

The automated calibration may include using an error calculation to systematically and programmatically recalibrate the machine.

The process 500 begins with gathering and/or receiving sensor data 502 as described herein. The sensor data is used to determine an evaluation 504 for an event, for example as described herein with respect to FIG. 4, or other locations throughout this description. The evaluation 504 is added to an appended buffer 506 for a particular fill event. Appended buffer 506 may be aggregated with other buffer data from other fill events over time to determine a trend 508 over a first time period. The trend 508 may include one or more variations in evaluation scores, settings, performance, or product delivered over the first time period.

The trend 508 may be evaluated at 510 to determine if one or more scores or characteristics evaluated over the first time period has an error that is over a threshold. The threshold may include an amount above and/or below a particular value. The error may be determined by determining a variance, variability, and/or deviation from a steady state or average for the particular score or characteristic. For example, a temperature over time may be compared against a steady state temperature, average temperature for the type of beverage, or set point for the temperature. If the difference between the benchmark (e.g., the steady state, set point, average, etc.) is over a threshold, then the system may be determined to be out of calibration or performing out of specification. If the error is under the threshold, then the process 500 may continue to evaluate the machine performance over subsequent time periods by returning to evaluate the trend 508.

At 512, the process includes a computing device determining if the error, that is over the threshold, is correctable through a recalibration. In some examples, this determination may be based on the type of error. For example, calibration changes may be able to adjust machine settings, but if flow quality or a machine component is faulty and determined to be the source of the error (e.g., an error notification on a display of the machine describing a component failure), then the computing device may determine that the error is not correctable through a recalibration and will instead notify a maintenance system 514 to schedule and/or request maintenance. The notification may include description of the error, any error codes, components involved, etc.

In the event that the computing device determines that the error is correctable through recalibration, then at 516 the computing device may automatically recalibrate the machine, or a manual recalibration may be performed. The automated recalibration may involve adjusting one or more setpoints, speeds, flow rates, and other machine settings and configurations to bring the identified characteristic of the beverage fill event back within the range defined by the threshold. After the settings are adjusted, according to the recalibration at 516, then the computing device may evaluate at 518, over a second time period, a trend or error in the selected characteristic or score. In this manner, the recalibration at 516 and the re-evaluation at 518 may be used to iteratively recalibrate the machine to dial in performance of the functions thereof.

During the evaluation at 518, the computing device determines if the trend error persists, as shown at 520, and if persistent then the recalibration may be performed iteratively and/or the computing device may request maintenance at 514. In the event that the evaluation at 518, the trend and/or error is within the threshold, which may include a second threshold that is greater or smaller than the initial threshold, then the computing device may determine a successful recalibration at 522.

Figure 6:
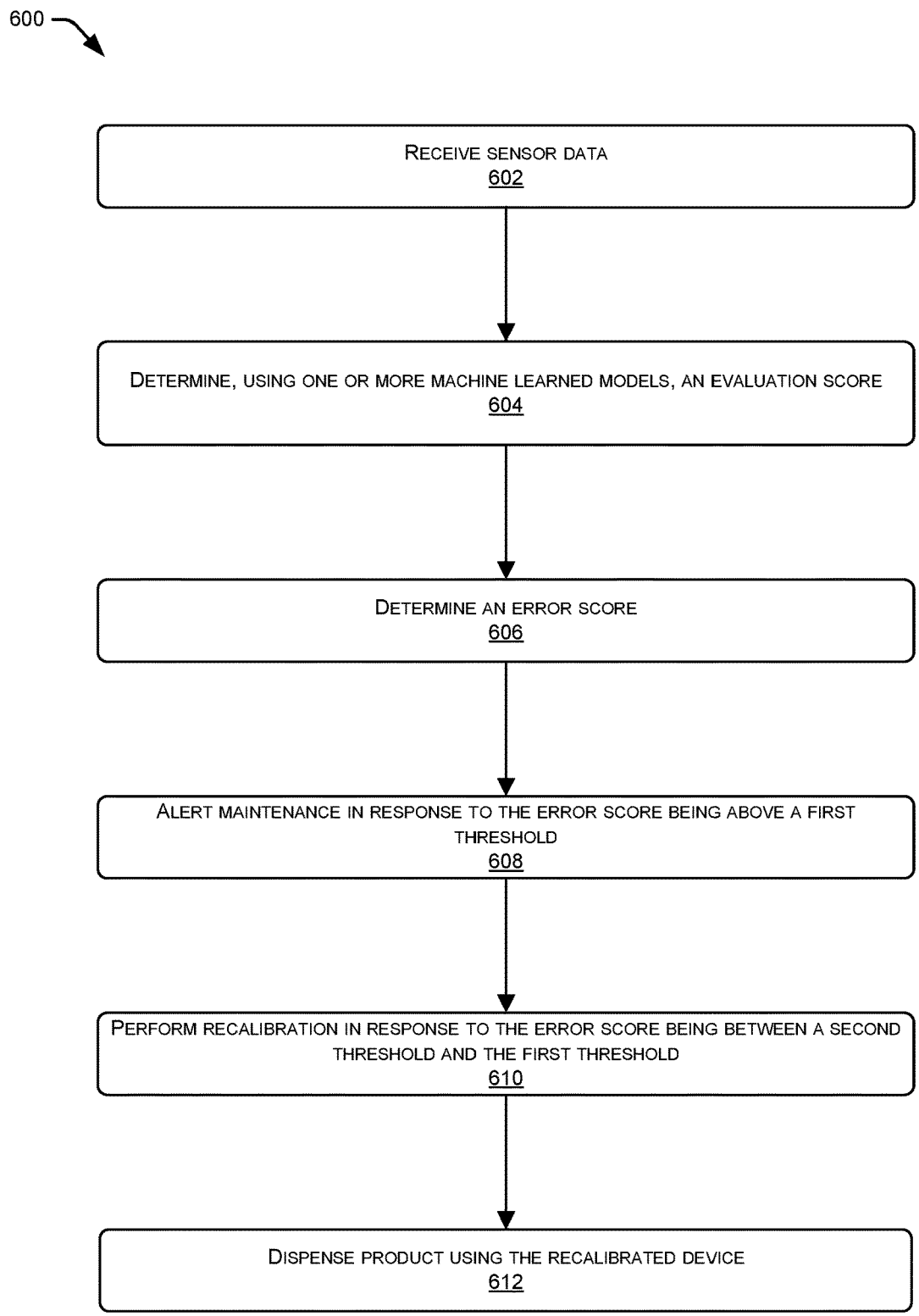
FIG. 6 illustrates a flow diagram depicting a process for evaluating an automated beverage dispenser system, according to at least one example.

FIG. 6 illustrates a flow diagram depicting a process 600 for evaluating an automated beverage dispenser system, according to at least one example. The process 600 may be performed by a computing device associated with a facility and/or dispensing machine, such as described herein. At 602, the process includes the computing device receiving sensor data from a camera and/or one or more additional sensors related to operation of the dispensing machine. The sensor data may include image data as well as other data such as proximity data, operating status data, order data, and other such information.

At 604, the process 600 includes the computing device determining, using one or more machine learned models, an evaluation score for performance of the dispensing machine. The machine learned models may each be configured to determine a particular evaluation, such as evaluation of beverage type, temperature, carbonation, ice amount, beverage fill level, cup placement, cup delivery, and other such factors. In some examples, a single machine learned model may be used to output one or more evaluation scores associated with characteristics of the machine, beverage, conveyor, or other such components.

For example, the computing device may determine that a cup is being filled with a dark beverage and may determine a beverage type, brand, or other such identification of the beverage. The computing device may also determine if the cup is under-filled, over-filled, or filled to a target range as well as presence of double or multiple cups. The computing device may also determine a carbonation level and the presence of ice or a hot beverage. The computing device may determine the position of the cup (e.g., as delivered by the conveyor and/or manual placement) and any other errors due to conveyor or cup delivery from a cup dispenser (e.g., dispensing the wrong size or type of cup for the ordered beverage). The computing device may also use image data from the camera to view a display of the automated dispenser and determine if any notifications are provided on the screen. The computing device can output an evaluation of the fill for one or more cups from start to end, for example over a time period. In this manner, one or more beverage fills may be observed by the computing device to determine trends in errors or evaluation scores and thereby identify a need for recalibration of a component or function and/or maintenance for the system. Degradation or slight errors in the cup filling can be observed through such aggregation that may not be visible or readily apparent to a manual observer such as a worker or operator.

The computing device may implement a set of machine learned models for various determinations and evaluations of the system. For instance, a first model may be used for detection of a cup (e.g., as dispensed and/or delivered by a conveyor system or otherwise). After a cup is detected at the fill location, the computing device may implement a series of models, such as described herein to determine different scores and evaluation of different aspects associated with filling the cup. A buffer for filling a particular cup can be updated to include the output of the different models until the cup is removed. After the cup is removed, the buffer may be reset and the data from the previous fill may be stored or used for trend evaluation.

At 606, the process 600 includes the computing device determining an error score based at least in part on the evaluation score. The error score may include a trend in performance along one or more metrics over a period of time. The error score may include an indication of a drift in a particular evaluated characteristic over a time period. The error score may include a deviation from a set point or steady state expected value for a particular characteristic. The error score may be determined using one or more machine learning models and/or algorithms to determine a variation or deviation from an expected value over a time period and/or at an instantaneous time.

At 608, the process 600 includes the computing device alerting a maintenance system in response to the error score being above a first threshold. For instance, if the deviation from the expected value is great enough to be over the first value, then the computing device may determine that a system component is malfunctioning and/or failed and requires maintenance.

At 610, the process 600 includes the computing device performing and/or instructing a recalibration of the machine in response to the error score being between a second threshold and the first threshold. The second threshold may be below the first threshold such that an error score between the first and second threshold is less significant than an error score exceeding the first threshold. The recalibration may include a manual and/or automated recalibration that may be performed, for example as described with respect to FIG. 5.

At 612, the process 600 includes the computing device dispensing product using the recalibrated device and/or continuing to distribute product in response to the error score being below the second threshold and/or following the recalibration. The error score may be continually re-evaluated for the machine to continually refine and evaluate performance of the machine and identify errors and/or needs for maintenance.

Figure 7:
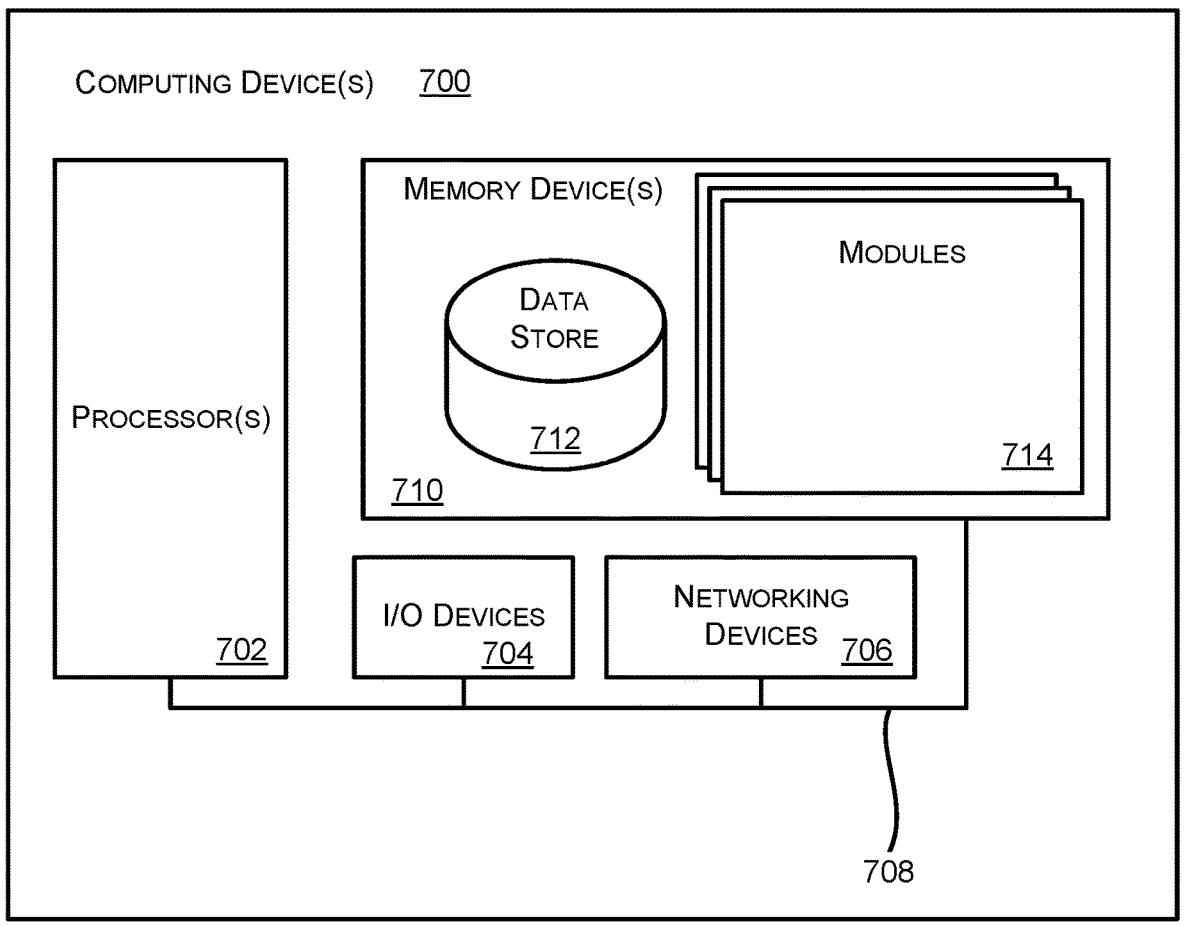
FIG. 7 illustrates a block diagram of a computing system for use with the systems and methods described herein, according to the present description.

FIG. 7 illustrates a block diagram of a computing device 700 for use in the systems and techniques described herein. The computing device 700 may include one or more computing devices on which services or modules of this technology may execute. The computing device 700 is illustrated on which a high-level example of the technology may be executed. The computing device 700 may be an example of the computing device(s) 114 of FIG. 1 or other such devices described herein. The computing device 700 may include one or more processors 702 that are in communication with memory devices 710. The computing device 700 may include a local communication interface 708 for the components in the computing device. For example, the local communication interface 708 may be a local data bus and/or any related address or control busses as may be desired.

The memory device 710 may contain modules 714 that are executable by the processor(s) and data for the modules 714. The module 714 may include the modules shown and described with respect to FIG. 3, among others. A data store 712 may also be located in the memory device 710 for storing data related to the modules and other applications along with an operating system that is executable by the processor 702.

The computing device 700 may further include or be in communication with a client device, which may include a display device. The client device may be available for an administrator to use in interfacing with the computing device 700, such as to review operation of a virtual computing instance, make improvements to machine learning models and so forth.

Various applications may be stored in the memory device 710 and may be executable by the processor 702. Components or modules discussed in this description that may be implemented in the form of software using high programming level languages that are compiled, interpreted or executed using a hybrid of the methods.

The computing device 700 may also have access to I/O (input/output) devices 704 that are usable by the computing devices. An example of an I/O device 704 is a display screen that is available to display output from the computing devices. Other known I/O device may be used with the computing device as desired. Networking devices 706 and similar communication devices may be included in the computing device 700. The networking devices 706 may be wired or wireless networking devices 706 that connect to the internet, a LAN, WAN, or other computing network.

The components or modules that are shown as being stored in the memory device 710 may be executed by the processor 702. The term "executable" may mean a program file that is in a form that may be executed by a processor 702. For example, a program in a higher level language may be compiled into machine code in a format that may be loaded into a random access portion of the memory device 710 and executed by the processor 702, or source code may be loaded by another executable program and interpreted to generate instructions in a random access portion of the memory to be executed by a processor 702. The executable program may be stored in any portion or component of the memory device 710. For example, the memory device 710 may be random access memory (RAM), read only memory (ROM), flash memory, a solid-state drive, memory card, a hard drive, optical disk, floppy disk, magnetic tape, or any other memory components.

The processor 702 may represent multiple processors and the memory device 710 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system comprising:
an automated beverage dispenser comprising:
a conveyor system for delivering a cup to be filled by the automated beverage dispenser;
a spout for delivering a beverage into the cup; and
a first sensor for determining a fill level of the beverage within the cup, wherein the automated beverage dispenser is configured to adjust a flow of the beverage based on data from the first sensor:
a camera positioned proximate the automated beverage dispenser and having a field of view comprising the automated beverage dispenser and a cup location beneath the spout; and
a computing device comprising:
a processor; and
one or more non-transitory computer-readable medium having instructions stored thereon that, when executed by the processor, cause the processor to perform operations comprising:
receiving image data from the camera, the image data associated with the automated beverage dispenser filling the cup:
determining, by using a machine learned model, one or more evaluation scores associated with the automated beverage dispenser filling the cup:
determining an error score associated with the automated beverage dispenser filling the cup based at least in part on the one or more evaluation scores:
generating an alert to a maintenance system in response to the error score being above a first threshold;
recalibrating the automated beverage dispenser in response to the error score being between a second threshold and the first threshold, wherein the second threshold is lower than the first threshold; and
storing, in a memory device associated with the computing device, the error score in response to the error score being below the second threshold.

2. The system of claim 1, wherein recalibrating the automated beverage dispenser comprises:
determining an error trend over a first time period based at least in part on the error score, the error trend indicative of an aggregation of one or more error scores over the first time period;
determining to recalibrate the automated beverage dispenser in response to the error trend being over a third threshold;
determining a function of the automated beverage dispenser associated with the error trend; and
recalibrating the function based on the error trend.

3. The system of claim 2, wherein recalibrating the automated beverage dispenser further comprises:
determining a second error trend over a second period of time;
generating the alert to the maintenance system in response to the second error trend being over a fourth threshold; and
determining a successful recalibration in response to the second error trend being below the fourth threshold.

4. The system of claim 1, wherein determining the one or more evaluation scores comprises generating the one or more evaluation scores using a set of machine learning models trained to output a set of evaluation scores associated with beverage temperature, beverage carbonation, cup fill level, cup placement, and beverage flow quality in response to the image data.

5. A method comprising:
receiving sensor data from a sensor configured to capture the sensor data associated with an automated beverage dispenser filling a cup;
determining, by using a machine learned model, an evaluation score associated with the sensor data;
generating an alert to a maintenance system in response to the evaluation score being below a first threshold;
determining to automatically recalibrate the automated beverage dispenser in response to the evaluation score being between a second threshold and the first threshold, wherein the second threshold is higher than the first threshold; and
determining to continue dispensing beverages in response to the evaluation score being above the second threshold.

6. The method of claim 5, further comprising recalibrating the automated beverage dispenser in response to determining to automatically recalibrate by:
determining a function of the automated beverage dispenser to recalibrate; and
adjusting the function based at least in part on the evaluation score.

7. The method of claim 6, wherein recalibrating the automated beverage dispenser further comprises:
determining an error trend over a first time period based at least in part on the evaluation score, the error trend indicative of an aggregation of one or more evaluation scores over the first time period;
determining the function of the automated beverage dispenser based at least in part on the error trend; and
adjusting the function based on the error trend.

8. The method of claim 7, wherein recalibrating the automated beverage dispenser further comprises:
determining a second error trend over a second period of time;
generating the alert to the maintenance system in response to the second error trend being over a fourth threshold; and
determining a successful recalibration in response to the second error trend being below the fourth threshold.

9. The method of claim 5, wherein determining the evaluation score comprises determining, by one or more machine learned models, a set of scores associated with a set of factors associated with filling the cup by the automated beverage dispenser.

10. The method of claim 9, further comprising recalibrating the automated beverage dispenser in response to determining to automatically recalibrate by:
determining a factor of the set of factors to recalibrate based on the set of scores;
determining a function of the automated beverage dispenser associated with the factor; and
adjusting the function based at least in part on a score of the set of scores associated with the factor.

11. The method of claim 5, wherein the sensor data comprises image data including a representation of a display associated with the automated beverage dispenser and wherein the evaluation score is further based on information shown on the display.

12. The method of claim 5, wherein the sensor comprises a camera positioned proximate to the automated beverage dispenser.

13. The method of claim 5, wherein the machine learned model is trained to output the evaluation score using image data tagged with score data and associated variance data for a range of beverage products.

14. The method of claim 5, further comprising:
receiving order data from an ordering system of a facility;
dispensing a cup based at least in part on the order data;
delivering the cup to a cup filling location using an automated conveyor system; and
filling the cup using the automated beverage dispenser based at least in part on the order data.

15. A non-transitory computer-readable medium having instructions stored thereon that, when executed by one or more processors, cause the one or more processors to perform operations comprising:
receiving sensor data from a sensor configured to capture the sensor data associated with an automated beverage dispenser filling a cup;
determining, by using a machine learned model, an evaluation score associated with the automated beverage dispenser filling the cup;
generating an alert to a maintenance system in response to the evaluation score being below a first threshold;
determining to automatically recalibrate the automated beverage dispenser in response to the evaluation score being between a second threshold and the first threshold, wherein the second threshold is higher than the first threshold; and
determining to continue dispensing beverages in response to the evaluation score being above the second threshold.

16. The non-transitory computer-readable medium of claim 15, wherein the operations further comprise recalibrating the automated beverage dispenser in response to determining to automatically recalibrate by:
determining an error trend over a first time period based at least in part on the evaluation score, the error trend indicative of an aggregation of one or more evaluation scores over the first time period;
determining a function of the automated beverage dispenser based at least in part on the error trend; and
adjusting the function based on the error trend.

17. The non-transitory computer-readable medium of claim 16, wherein the operations further comprise:
determining a second error trend over a second period of time;
generating the alert to the maintenance system in response to the second error trend being over a fourth threshold; and
determining a successful recalibration in response to the second error trend being below the fourth threshold.

18. The non-transitory computer-readable medium of claim 15, wherein determining the evaluation score comprises determining, by one or more machine learned models, a set of scores associated with a set of factors associated with filling the cup by the automated beverage dispenser.

19. The non-transitory computer-readable medium of claim 18, wherein the operations further comprise recalibrating the automated beverage dispenser in response to determining to automatically recalibrate by:
determining a factor of the set of factors to recalibrate based on the set of scores;
determining a function of the automated beverage dispenser associated with the factor; and
adjusting the function based at least in part on a score of the set of scores associated with the factor.

20. The non-transitory computer-readable medium of claim 15, wherein the operations further comprise:
receiving order data from an ordering system of a facility;
dispensing a cup based at least in part on the order data;
delivering the cup to a cup filling location using an automated conveyor system; and
filling the cup using the automated beverage dispenser based at least in part on the order data.

* * * * *